(No Model.)

C. F. BONHACK.
RELEASING DEVICE FOR STABLES.

No. 583,726. Patented June 1, 1897.

WITNESSES:
Geo. F. Jackel
R. F. Pelouze

INVENTOR
Chas. F. Bonhack
BY
Jacque & Jaeger
ATTORNEYS.

THE NORRIS PETERS CO., PHOTO-LITHO., WASHINGTON, D. C.

UNITED STATES PATENT OFFICE.

CHARLES F. BONHACK, OF NEW YORK, N. Y.

RELEASING DEVICE FOR STABLES.

SPECIFICATION forming part of Letters Patent No. 583,726, dated June 1, 1897.

Application filed August 14, 1896. Serial No. 602,737. (No model.)

*To all whom it may concern:*

Be it known that I, CHARLES F. BONHACK, a citizen of the United States, residing in the city, county, and State of New York, have invented certain new and useful Improvements in Releasing Devices for Stables, of which the following is a specification.

This invention has reference to improved means for releasing horses and cattle in large stables or barns in case of fire; and the invention consists of a releasing device for stables which comprises a longitudinal shaft that runs along all the ends of the stalls and is locked normally in position of rest by a suitable locking device, and of a hook-shaped arm attached to said shaft in each stall, the end of which arm rests on a supporting-block or against a flat spring and which holds, in connection with the lever, the snap-hook or ring of the halter of each animal. By turning the shaft the hook-shaped arms are elevated simultaneously and the horses are thereby released.

Figure 1:
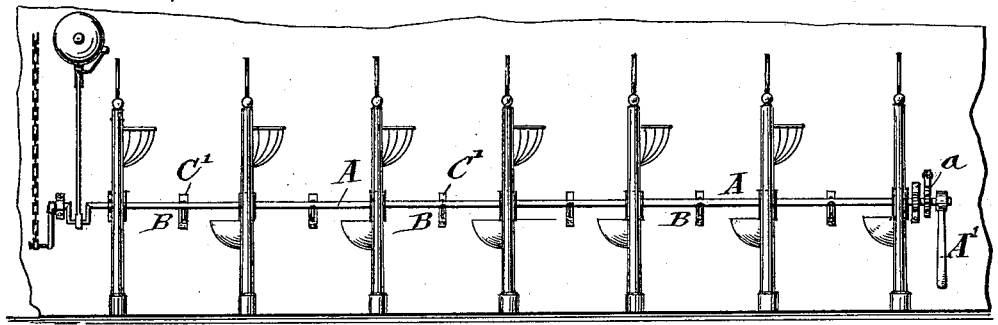
Figure 2:
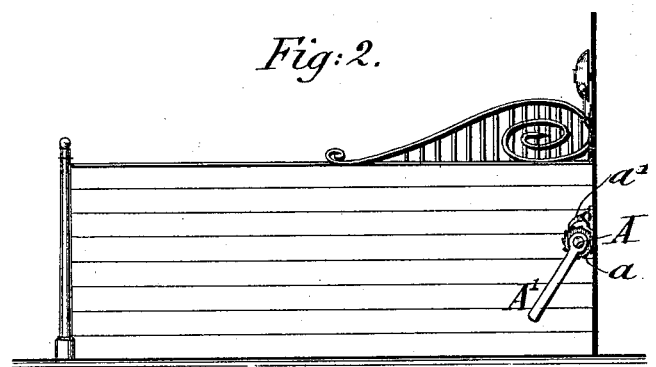
Figure 3:
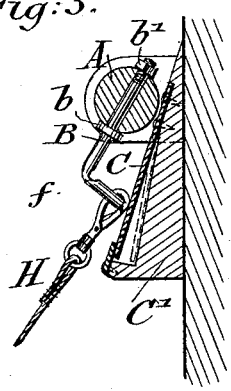
Figure 6:
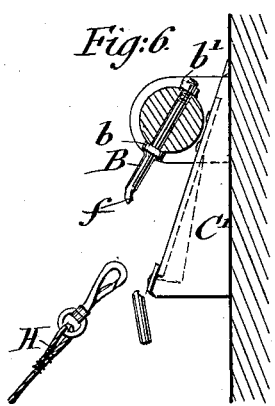
Figure 4:
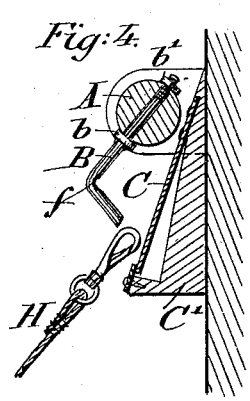
Figure 5:
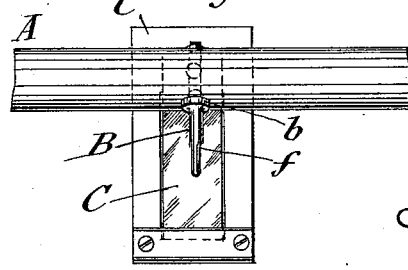

In the accompanying drawings, Figure 1 represents an end elevation of a number of stalls, showing my improved releasing device. Fig. 2 represents a side elevation of a stall provided with my improved releasing device. Fig. 3 is an enlarged cross-section showing my improvement with a halter secured thereto. Fig. 4 is a similar section showing the hook-shaped arm raised to release the halter. Fig. 5 is a detail elevation showing the shaft-hook-supporting block and spring; and Fig. 6 is a cross-section similar to Fig. 3, but showing the hook-shaped arm as broken by a hard pull on the halter.

Similar letters of reference indicate corresponding parts.

Referring to the drawings, A represents a horizontal shaft which is supported by suitable bearings at some distance from the floor of the stable and extends along the head ends of the stalls throughout the full length of the stable or barn. Each series of stalls in line with each other is in connection with the shaft, and the shafts of all the series may all be connected by chains and sprocket-wheels, so that all of the stalls on one floor, and even the stalls on the floors above the ground-floor, when properly connected with a primary shaft, can be operated simultaneously from one point in the stable. This arrangement is too evident without requiring illustration. The primary shaft A is provided on the end which is to be operated with a suitable lever or hand-wheel A' and with a ratchet-wheel $a$, that is locked by a suitable pawl $a'$, so that the shaft cannot be turned on its axis except the pawl is removed out of engagement with the teeth of the ratchet-wheel $a$. The shaft A is provided in each stall with a hook-shaped arm B, the shank of which passes through a diametrical hole in the shaft and is attached thereto by a collar $b$ on the arm at one side of the shaft and by a screw-nut $b'$, that screws on the threaded end of the arm, at the opposite side of the shaft, as is shown clearly in Figs. 3 to 6. In this manner the arms B are rigidly attached to the shaft and prevented from becoming detached therefrom. The end of the arm which passes through the shaft A is preferably made square-shaped, and also the diametrical hole in the same, so that the arm cannot turn on its axis, but is rigidly supported by the shaft A.

The curved or hook-shaped lever-arm B rests with its end on a flat spring C, secured at one end to and free to be pushed back into a recess in an inclined block C', that is attached by straps, screws, or otherwise to the head-wall of each stall, said spring C forming a support for the arm B, or, in case said spring is omitted, the block C'. If the halter carries a simple ring, the spring C is necessary, as it can be pushed back so that the ring can be slipped onto the hook-shaped arm, but if the halter has a snap-hook the spring can be omitted. In case of fire the shaft is turned after first releasing the pawl from the ratchet-wheel at the end of the shaft, so that by the turning of the shaft all the arms B are simultaneously moved away from the blocks and supported in raised position by the pawl, which is dropped back into the ratchet-wheel. Simultaneously all the halters H are detached from the arms, so that each horse is free to escape from its stall and out of the building in case of fire. Each arm B is provided some distance from its end with a reduced portion, forming a point of weakness, as is shown at $f$, said reduced portion being so made that the arm is strong enough to resist ordinary strain exerted thereon by the horse, but not strong enough to resist strain exerted by the horse when struggling for its life against an approaching fire. In this case the arm would be broken at the point of weakness by the extra strain exerted thereon by the horse. In case no access be possible to the building, so that the shaft can be operated, the breaking of the arm produces means of escape for the horse, so that it can at least make a struggle for life without perishing from the smoke, as in most cases of stable fires.

In connection with the shaft of the releasing device a gong G may be also arranged, so that by the striking of the gong the attention of the horses is attracted, while the liberation of the halter indicates that they are free to move for safety.

Any broken arm C can be readily replaced by a new arm by simply unscrewing the screw-nut and detaching it from its socket-hole in its shaft. A number of arms should be kept in reserve for this purpose, so as to be ready for use after the fire is extinguished.

My improved releasing device for stables has the advantage that the slaughter of horses or cattle that occurs when large stables or barns get afire is prevented. It can be applied with small expense to the stalls of stables and forms a humane attachment by which the horses are enabled to obtain their freedom in case of danger from fire, so as to give them a chance to escape without being compelled to perish helplessly.

Having thus described my invention, I claim as new and desire to secure by Letters Patent—

1. A releasing device for horses or cattle, consisting of an oscillatory shaft provided with a series of hooked arms, blocks supported on the head-wall of the stalls, and spring-plates on the blocks, against which the free ends of the arms rest, substantially as set forth.

2. The combination, with the stalls of a stable, of a shaft supported longitudinally along the head-wall of the stalls, means for locking said shaft in position, hook-shaped arms attached to the said shaft, inclined supporting-blocks for said arms provided with recesses, and spring-plates fixed in the recesses of said blocks, against which the free ends of the arms rest, substantially as set forth.

In testimony that I claim the foregoing as my invention I have signed my name in presence of two subscribing witnesses.

CHAS. F. BONHACK.

Witnesses:
 PAUL GOEPEL,
 GEO. W. JAEKEL.